Patented May 13, 1941

2,242,084

UNITED STATES PATENT OFFICE 2,242,084

PROCESS OF TRANSPOSING 1,2-DICHLOROBUTENE-3

Otto Nicodemus, Frankfort-on-the-Main-Hochst, and Walter Schmidt, Frankfort-on-the-Main-Unterliederbach, Germany, assignors to I. G. Farbenindustrie Aktiengesellschaft, Frankfort-on-the-Main, Germany No Drawing. Application October 11, 1938, Serial No. 234,374. In Germany October 26, 1937

5 Claims. (Cl. 260—654)

The present invention relates to a process of transposing 1,2-dichlorobutene-3.

During the addition of chlorine to 1,3-butadiene the two dichlorobutenes, namely the 1,2-dichlorobutene-3 and the 1,4-dichlorobutene-2, are produced side by side. Owing to the readiness with which its chlorine atoms can be exchanged, the 1,4-dichlorobutene-2 is of greater industrial interest than the isomeric product. Hitherto, however, it has not been possible to avoid the formation of the 1,2-dichlorobutene-3; according to a statement in the relevant literature (Journal of the American Chemical Society, vol. 52, page 4046) it is even produced in a larger quantity than the desired 1,4-dichlorobutene-2. Unlike the corresponding dibromobutenes the dichlorobutenes do not transpose spontaneously into one another, as has been ascertained by Muskat and Northrup (loc. cit., page 4047).

Now we have found that the transposition of the 1,2-dichlorobutene-3 into the industrially more important 1,4-dichlorobutene-2 occurs in the presence of a catalyst according to the following equation:

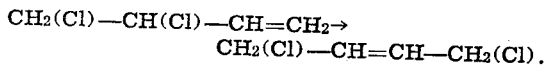

As catalysts there may be used the metal halides, the compounds thereof and mixtures with one another. Particularly useful as catalysts are metal halides which are employed in the organic chemistry to promote condensation reactions, especially such ones splitting off hydrogen chloride. Such metal halides are, for instance, FeCl₃, TiCl₄, ZnCl₂, AlCl₃, and mixtures of these metal chlorides with one another. Said catalysts may also be applied in admixture with other metal chlorides, as for instance NaCl, CuCl, BaCl₂. This is advantageous in the case of the catalyst showing too strong an effect. For this reason, aluminium chloride in particular is suitably melted together with another metal chloride.

The duration and temperature of the reaction can readily be chosen according to the activity of the catalyst applied, so that substantially no undesirable condensation products are obtained. When the reaction mixture no longer contains a substantial amount of 1,2-dichlorobutene-3, the operation is terminated. The reaction is suitably conducted at a temperature of at most about 50° C., preferably, however, at temperatures between about −10° C. and about +10° C. The catalysts are preferably used in amounts of about 1 per cent. to about 10 per cent., calculated upon the amount of the 1,2-dichlorobutene-3.

In some cases the reaction product can readily be separated from the catalyst by distillation. In other cases it is advisable to prevent further reaction by the addition of low temperature water.

The 1,2-dichlorobutene-3 may also be transposed at the very moment of its formation, for instance during the chlorination of the butadiene. When the catalyst is added during the chlorination of the butadiene, the formation of the 1,2-dichlorobutene-3 is greatly repressed and the formation of the 1,4-dichlorobutene-2 is promoted according to the following equation:

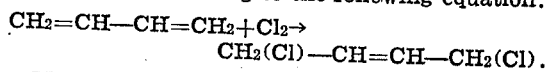

The following examples serve to illustrate the invention, but they are not intended to limit it thereto, the parts being by weight, unless otherwise stated:

1. 14 parts of AlCl₃ and 16 parts of sublimed FeCl₃ are heated together in a closed vessel to 300° C. and 2.5 parts of this comminuted or pulverized melt are added, at −5° C. to −10° C., while stirring, to 50 parts of 1,2-dichlorobutene-3 of boiling point 42° C. to 44° C., under a pressure of 40 mm. of mercury. After the refrigerating bath has been removed the temperature of the mass is gradually allowed to rise to +10° C. A small quantity of ice water is then added. The whole is then filtered and subjected to a fractional distillation; during this operation 30 per cent. of unaltered parent material and—after a small intermediate running—61 per cent. of 1,4-dichlorobutene-2 of a boiling point of 73° C. to 75° C. under a pressure of 40 mm. of mercury are distilled, that is, 88 per cent. of the 1,2-dichlorobutene-3 which has been caused to react. Only 2 per cent. of by-products of higher boiling point have been formed.

2. 14 parts of AlCl₃ and 10 parts of cuprous chloride are fused together as described in Example 1 and the melt is used, as therein described, as transposition catalyst. 80 per cent. of the 1,2-dichlorobutene-3 which has been caused to react has been transformed into the isomeric product.

3. 50 parts of 1,2-dichlorobutene-3 are mixed, while well cooling, with 2 parts of sublimed iron chloride and the transposition reaction is interrupted at +2° C. by the addition of a small quantity of ice. After working up 78 per cent. of the 1,2-dichloro-butene-3 which has been caused to react have been transposed into pure 1,4-dichlorobutene-2.

4. As in the preceding examples, 50 parts of 1,2-dichlorobutene-3 are mixed with 2.5 parts of titanium tetrachloride and then, at room temperature, with a small proportion of water. After separating, drying and filtering the dichloro-derivatives, 72 per cent. of the dichlorobutene which has been caused to react can be isolated as 1,4-dichlorobutene-2.

5. If the double compound $AlCl_3.2NaCl$ is used as described above as a catalyst and the whole is fractionated after the catalyst has been removed by filtration, about the same yield of 1,4-dichlorobutene-2 is obtained as in Example 4. The reactions with the double compounds $4AlCl_3.3ZnCl_2$, $2AlCl_3.BaCl_2$ and the melts $AlCl_3+CuCl_2$ and $FeCl_3+TiCl_4$ made as described in Example 1 take a similar course.

6. Into 1000 parts by volume of chloroform containing 10 parts of the aluminium chloride-ferric chloride melt, prepared as described in Example 1, there are introduced, first 50 parts of butadiene and then, at a temperature of $-10$ C. and per hour, 32 parts each of chlorine and 1,3-butadiene. After 8 hours the introduction is discontinued, the refrigerating bath is removed and 8 parts of ice water are added to the reaction mixture at a temperature of $+10°$ C. After filtration and fractionation, the dichlorobutene fraction contains only 41 per cent. of 1,2-dichlorobutene-3, whereas, without addition of the catalyst, there are formed under otherwise the same conditions 55 per cent. of the said dichlorobutene of lower boiling point.

We claim:
1. The process which comprises causing a metal halide condensing agent to act upon 1,2-dichlorobutene-3 at a temperature of at most 50° C.

2. The process which comprises causing a catalyst of the group consisting of $AlCl_3$, $FeCl_3$, $TiCl_4$ and $ZnCl_2$, to act upon 1,2-dichlorobutene-3 at a temperature of at most 50° C.

3. The process which comprises causing a catalyst of the group consisting of $AlCl_3$, $FeCl_3$, $TiCl_4$ and $ZnCl_2$, to act upon 1,2-dichlorobutene-3 at a temperature between about $-10°$ C. and about $+10°$ C.

4. The process which comprises causing 2.5 parts of a mixture of aluminium chloride with ferric chloride to act upon 50 parts of 1,2-dichlorobutene-3 at a temperature between $-10°$ C. and $+10°$ C.

5. The process which comprises causing 2.5 parts of a mixture of aluminium chloride with cuprous chloride to act upon 50 parts of 1,2-dichlorobutene-3 at a temperature between $-10°$ C. and $+10°$ C.

OTTO NICODEMUS.
WALTER SCHMIDT.